Aug. 16, 1960 B. KAZAN 2,949,537

RADIANT ENERGY SENSITIVE DEVICE

Filed Dec. 30, 1954 2 Sheets-Sheet 1

INVENTOR.
BENJAMIN KAZAN
BY
William A. Zalesak
ATTORNEY

INVENTOR.
BENJAMIN KAZAN
BY
William A. Zalesak
ATTORNEY

United States Patent Office 2,949,537
Patented Aug. 16, 1960

2,949,537

RADIANT ENERGY SENSITIVE DEVICE

Benjamin Kazan, Princeton, N.J., assignor to Radio Corporation of America, a corporation of Delaware Filed Dec. 30, 1954, Ser. No. 478,707

12 Claims. (Cl. 250—213)

This invention relates to radiant energy sensitive devices utilizing radiant energy sensitive surfaces or layers.

This invention is directed to improving the sensitivity of such devices. One example is a certain type of picture reproducer which, for design reasons, utilizes a thick layer of photoconductive material as a light sensitive element. In such devices the photoconductive layer may be so thick that light is unable to penetrate completely through the layer. Hence, under excitation, there exists through the thickness of the photoconductive layer a low impedance layer where the light penetrates and a series high impedance layer which the light does not penetrate and which remains unsensitized. The presence of such an unsensitized layer causes inefficient operation of the device and greatly detracts from the overall performance of the device, especially its sensitivity, and, if the device is a picture reproducer, its brightness and amplification.

The probable uses of this invention include area photo devices, whether the devices is a photocell itself or is used as a layer scanend with an electron beam or light beam to give signals. It would also apply to photolayers used in conjunction with electroluminescent layers or other light producing layers for picture reproduction or amplification.

One type of picture reproducing device to which this invention applies utilizes a projection screen constituted of a layer of photoconductive material and a layer of electroluminescent material sandwiched between two transparent electrodes. The electroluminescent material is constituted of particels of luminescent phosphor material embedded in a dielectric and having the property of emitting light under the influence of an electric field. A voltage is applied across the two electrodes to provide an electrical circuit in which the impedances of the two layers are in series. It has been necessary to make the thickness of the photoconductive layer much greater than that of the electroluminescent layer so that the impedance of the photoconductive layer in the dark will be many times that of the electroluminescent layer, and a greater fraction of the applied voltage will be developed across the photoconductive layer. Under these conditions, the voltage across the electroluminescent layer is below the threshold voltage required to cause visible luminescence and no light is emitted from the electroluminescent layer. When light falls on the photoconductive material, its impedance is lowered in the areas where the light strikes, and a greater fraction of voltage is applied across the electroluminescent material directly in contact with the illuminated areas of the photoconductor. The electroluminescent material is thus caused to emit light.

The light emission increases with an increase in the voltage applied across the electroluminescent layer so that a half tone image can be projected on the photoconductive material and a corresponding half tone image will be reproduced on the electroluminescent material. In addition, if the input image is of low intensity, the output image can be an amplified light image. Also an invisible image, such as an infrared image or an ultraviolet image can be converted or reproduced in visible form if a photoconductive layer responsive to infra red or ultra violet is used.

In some devices, the electroluminescent layer is about 1 mil in thickness, and to achieve the required voltage distribution between the two layers in the dark, the photoconductive layer is made about 10 mils thick. Such a thick photoconductive layer is not very efficient because substantially all the light is absorbed within a short depth of the photoconductor and the lower depths remain relatively unilluminated. The problem, therefore, is to devise some means whereby the effective depth of the photoconductor excited by the incident light is greatly increased, in order to provide a more efficient photoconductive layer and thus produce greater light output from the electroluminescent layer.

It is therefore an object of this invention to provide a radiant energy sensitive device having improved sensitivity.

It is a further object to provide an improved light sensitive device having a novel photo conductive element in the form of a layer having some thickness but which nevertheless permits light to penetrate through a greater effective depth.

It is a further object to provide an improved light image reproducer of the kind including as one of its elements a photoconductive layer, said image reproducer having greatly improved sensitivity.

The foregoing and other objects may be achieved according to the invention by providing in the light sensitive element of a device of the character described elongated regions which are more light transparent than the photoconductive material of which the light-sensitive element is composed. Thus, according to one embodiment of the invention, a relatively thick layer of photoconductive material is provided with grooves extending substantially through its whole depth to form a corrugated surface on the layer. Light incident on the grooved side of the layer is permitted to fall on the sides of the grooves and penetrate therethrough. The photoconductive layer is thereby excited in paths which extend from one electrode to the other along the surfaces of the grooves, and thus through the entire effective depth of the layer.

While the devices described herein have particular utility in detecting or reproducing light or light images falling in the visible spectrum, the principles of this invention apply also to other types of radiation, for example X-rays, infrared radiation, ultra-violet radiation, and the like. Here, for simplicity, the term "radiant energy" will be understood to encompass X-rays as well as visible and invisible light, and the term "photoconductive" to be the generic expression for the property of responding to said radiant energy.

Figures 1, 2, 4, 5:
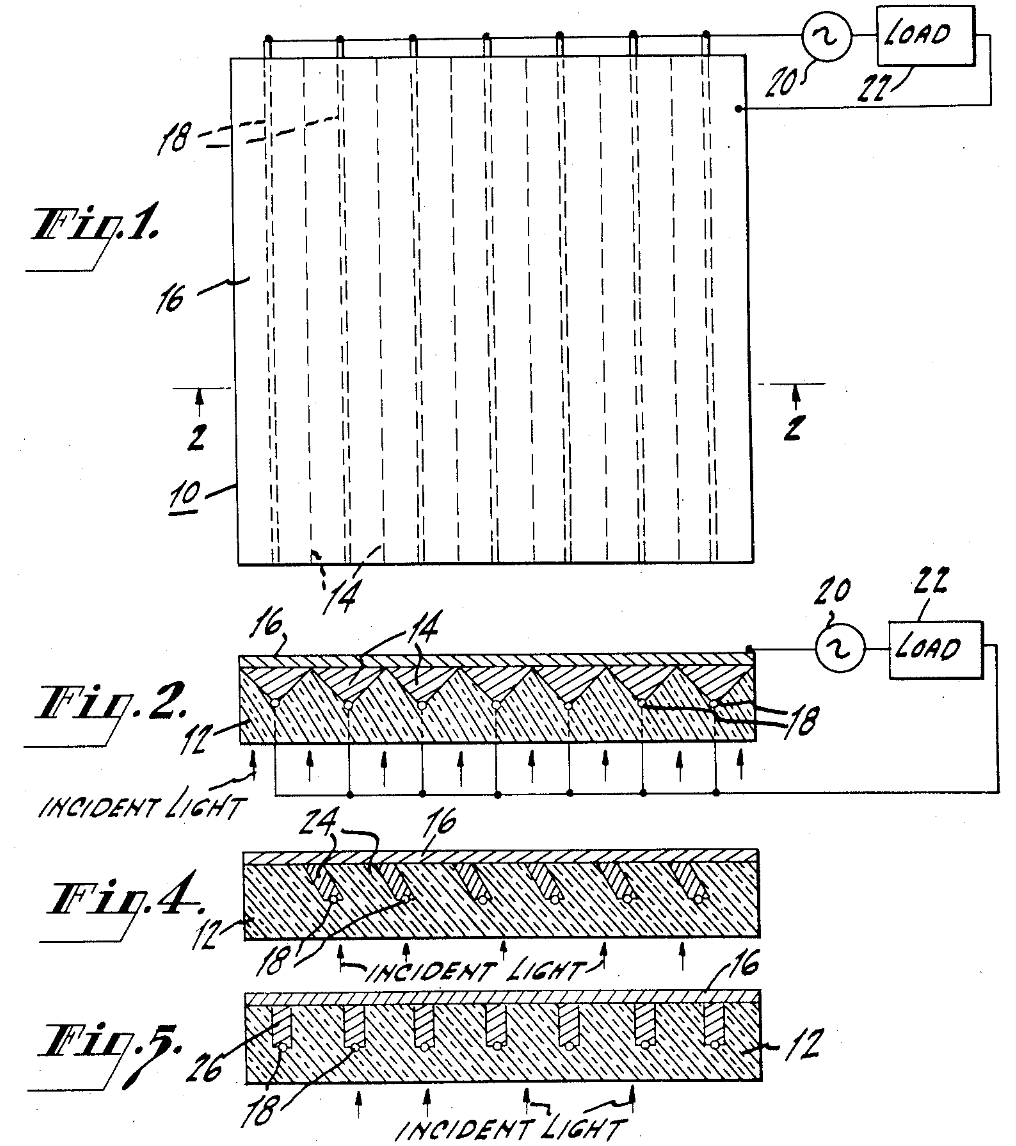
Fig. 1 is a plan view of a photoconductive cell constructed in accordance with the invention.
Fig. 2 is a section of the cell of Fig. 1 taken along the lines 2—2.
Figs. 4 and 5 are sections of modifications of the cell shown in Figs. 1 and 2.

Referring to Figs. 1 and 2 in detail, there is shown a photosensitive cell constructed in accordance with the invention. The cell comprises a transparent base member 12, having a layer 14 of embedded photoconductive material having a corrugated surface, and on the photoconductive layer 14 a layer 16 of conductive material. As shown more clearly in Fig. 2, the base member 12 is formed with parallel grooves of a depth corresponding to the overall thickness desired of the photoconductive layer 14. Fine conductive elements or wires 18 are set in the bottom of the grooves and extend longitudinally thereof. The remaining space in the grooves is filled with photoconductive material to form the photoconductive layer 14. While the layer 14 is thus broken up into an array of elongated elements, the elements are contiguous, that is, touching or nearly touching so that their inclined surfaces present a substantially unbroken photoconductive surface to radiations incident thereon. Stated differently, the inclined surfaces of these photoconductive elements define a total projected area which is substantially equal to the entire area emcompassed by the array of elements. The conductive elements 18 are connected together at their ends, thus serving as one electrode of the photosensitive cell, with the layer 16 forming the other electrode. The cell electrodes are connected to an external circuit which includes a voltage supply 20 and a load 22.

The base member 12 is made of material which easily transmits the type of radiation to be employed, for example glass or plastic. Fine wires may be used for the conductive elements 18, or, if desired, fine lines of silver paint may be applied to the plate 12. The photoconductive material may be any of the well known materials sensitive to the radiation employed. Cadmium sulfide, cadmium selenide, and lead sulfide are mentioned as examples. The photoconductive material may be applied in dry powder form, or it may be mixed with a suitable plastic binder, such as ethyl cellulose or methyl methacrylate, for example. The conductive layer 16 may be a film of evaporated aluminum or silver, or sprayed silver paint, for example.

Figure 3:
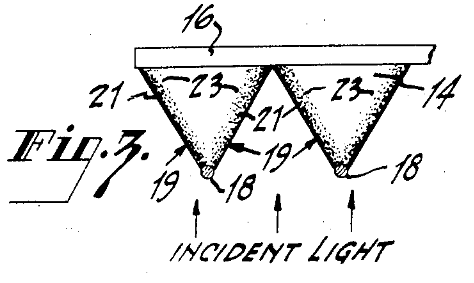
Fig. 3 is an enlarged fragmentary view with portions removed of Fig. 2.

In operation, the cell is exposed to incident light with the base member 12 facing the light, as shown in Fig. 2. The light passes through the base member 12 and strikes the slanting sides of the photoconductive layer 14. Referring to Fig. 3, the light will penetrate the photoconductor surfaces and will be substantially entirely absorbed within a short depth for example, several mils below the exposed surfaces. The extent of light penetration is generally indicated by the shaded regions 19. Although there is no sharp boundary which divides regions of total light absorption from regions of no light absorption, quantitatively most of the light will be absorbed on the outer surface areas 21 and the remainder in progressively decreasing amounts in the inner areas 23. The excited regions 19 of the photoconductor extend from the conductive elements 18 to the support plate 16 and provide low impedance paths to current flow between these two electrodes and thus through the photoconductor. The impedance in these regions 19 will decrease as the intensity of the incident light increases. In this way, then by providing regions such as the "hills" of glass or plastic, which are more light transparent than the photoconductive material, the photoconductive layer is sensitized through a greater effective depth than would be possible with a uniformly thick layer. It is therefore possible to construct cells having very thick photoconductive layers and yet permit incident light to excite the deeper regions thereof.

The shape of the grooves bearing the photoconductive material may be varied to suit the designer's preference. A desirable shape is one having a triangular cross-section as shown in Fig. 2 since it permits uniform illumination of the photoconductive surfaces. However, it may be desirable from the standpoint of conserving photoconductive material to provide thin rectangular-shaped elements in the photoconductive layer, as shown in Figs.

4 and 5. The elements may be sloping as in layer 24 of Fig. 4, thus exposing one of the sloped sides directly to incident light and the other side to reflected light. In Fig. 5, the elements of layer 26 are upright to expose both sides equally. In this case the elements would receive a considerable part of the excitation by light reflected from the sides of the filled slots or by light entering the device at an angle from the normal.

Figure 6:
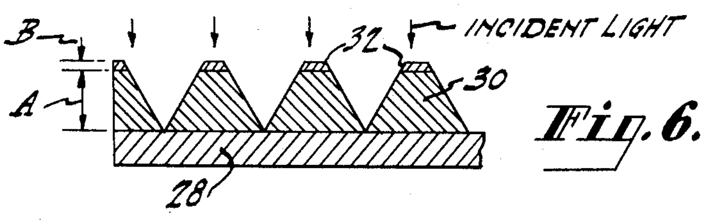
Fig. 6 is a section of a still further modification of the invention.

A further embodiment is shown in Fig. 6, and comprises a support plate 28 of conductive material and a grooved layer 30 thereon of photoconductive material having a corrugated surface, the ridges of the layer 30 being coated with conductive material 32, such as silver paste, for example. The support plate 28 may, but need not be made of transparent material. It may be constructed of metal, or it may be of glass or plastic having a conductive coating, for example tin chloride, applied to one surface for making contact to the photoconductive layer 30.

The structure of Fig. 6 may be formed by coating the plate 28 with a uniformly thick layer of photoconductive material of a desired thickness A, followed by a layer of silver paste of a desired thickness B, as indicated generally in Fig. 6. The cell is then machined, by grinding or milling, for example, to remove part of the material and leave grooves for permitting light to penetrate therein and excite the photoconductive material along its entire depth. Leads may be connected to the plate electrode 28 and the coated ridges 32 for applying operating voltages.

Another alternative would be to mold the grooves in photoconductive material on the metal plate with a plastic mold and then coat the ridges of the grooved photoconductive layer with silver paint.

Figure 7:
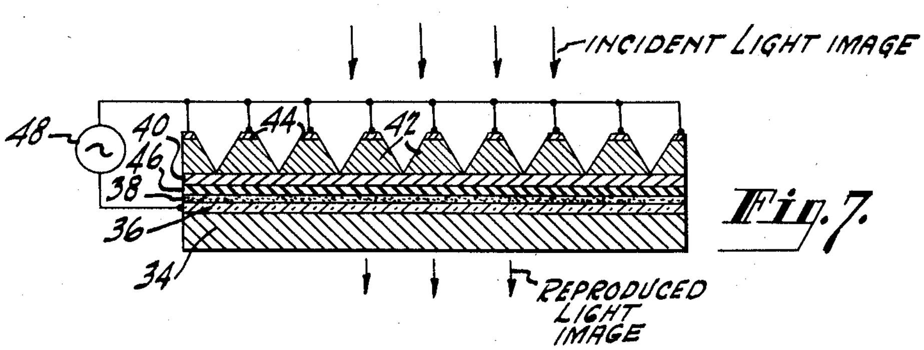
Fig. 7 is a section of a light amplifier incorporating the cell of Fig. 6.

Fig. 7 shows an improved light amplifier incorporating a photoconductive cell made according to the invention. For simplicity the cell of Fig. 6 is shown; however the cell constructions shown in Figs. 1–5 may also be used.

Referring to Fig. 7, there is shown a layered structure comprising a transparent support member or glass plate 34, a transparent conductive film 36, which may be a film of tin chloride, for example, a layer of electroluminescent material 38, a current diffusing semi-conductive layer 40, a grooved photoconductive layer 42, and conductive elements or lines 44. If desired a light opaque insulating layer 46 may be interposed between the photoconductive layer 42 and the electroluminescent layer 38. The conductive elements are connected together and to one side of a voltage source 48, preferably alternating current. The other side of the voltage source is connected to the film 36.

The maximum width of the grooves should not exceed the width of a picture element, and preferably should be appreciably smaller, in order to preserve picture resolution. The electroluminescent material may be constituted of particles of electroluminescent phosphor material embedded in a dielectric, and has the property of emitting light under the influence of an electric field. It may comprise zinc sulfide activated with copper and mixed with a suitable plastic such as ethyl cellulose.

The current diffusing layer 40 may be omitted, if desired, but it is preferred to use it.

One function of the current diffusing layer 40 is to electrically connect each point of the photoconductive surface to the corresponding or opposite point of the electroluminescent surface. It also acts as a current diffusing element. These functions will later be described. The material of the current diffusing layer, for example, may comprise cadmium sulfide which has been made semi-conductive by first adding cadmium chloride and then heating the mixture to about 700° C. for 20 minutes. The current diffusing layer compared to the illuminated photoconductive layer and the electroluminescent layer has a low impedance through its thickness and a relatively high impedance in a direction parallel to its surfaces.

In operation of this device, consider the relative thicknesses of the photoconductive layer 42 and the phosphor layer 38 to be adjusted so that the series impedance of the photoconductive layer in the dark or unexcited condition is of the order of ten times that of the phosphor layer. Since these impedances are in series with the supply voltage 48, the apportioned voltage appearing across the photoconductive layer will be approximately ten times the voltage appearing across the phosphor layer. Also consider the supply voltage to be adjusted so that the magnitude of the voltage appearing across the phosphor layer is below the threshold value required to cause visible luminescence of the phosphor. Under these conditions then, with no incoming radiation incident on the photoconductor, no light is emitted from the phosphor.

Consider then an amount of light falling on an elemental area of the photoconductor, for example the surface area between two adjacent ones of the conductive lines 44. The conductivity of the photoconductor will increase in this area, conducting paths being provided adjacent to the exposed surfaces between the lines 44 and the current diffusing layer 40. This increase in conductivity, or drop in impedance, of the photoconductor, which is a function of the intensity of the incident light, causes a corresponding increase in the voltage appearing across the phosphor in an area directly adjacent to the excited photoconductor. The phosphor is thus caused to emit light in this area due to an increase at this localized area in the voltage above the threshold value required for luminescence. Because the intensity of the light emitted from the phosphor increases with increasing field developed across the phosphor, it is readily seen that an image with half-tones can be reproduced on the phosphor surface which is a replica of the image incident on the photoconductor.

The opaque layer 46 may be a thin film of black lacquer or it may be carbon particles mixed with a suitable plastic. The opaque layer 46, if used, will prevent light feedback from the phosphor layer to the photoconductive layer. The layer 46 may be omitted, and light feedback will be prevented if the light emitted from the phosphor layer falls within a range of wavelength lying outside that portion of the spectrum to which the photoconductive layer is sensitive. Also, the current diffusing layer 40 may itself be sufficiently opaque to prevent light feedback. It may be advantageous under certain circumstances, to omit the opaque layer 46 and allow light feedback to enhance the amplification or to store a reproduced image even after the incident image is removed.

As indicated previously, if a uniformly thick solid layer of photoconductive material is used in a picture reproducer of the kind shown, the incident light will not reach the lower depths of the photoconductive layer. Hence, the photoconductive layer will be inefficient in transferring the maximum desired proportion of the total supply voltage to the phosphor layer for any given level of incident light. With a device constructed according to Fig. 7, however, in which a grooved photoconductive layer is used, this handicap is overcome. In this device incident radiation illuminates the photoconductive material along the entire surface of the grooves. Thus, the incident light provides a current conducting path from the conducting lines 44 to the current diffusing layer 40.

In the absence of the current diffusing layer 40, the photo current flowing between the electrodes 44 and 36 and through the photoconductor-phosphor interface would tend to be concentrated at restricted areas of the phosphor layer in the regions corresponding to the bottom of the grooves, in the photoconductor, i.e. where the photoconductive surfaces intersect. In such case, only small areas of the total available phosphor surface would be excited to luminescence and a great portion of the phosphor surface would remain unexcited. The presence of the current diffusing layer 40 overcomes this effect because it causes the current at any of these regions to "fan" or spread out to an electroluminescent area whose width is about equal to the spacing between photoconductor groove centers. The light emitting area of the phosphor layer is thus increased.

In addition, the presence of the current diffusing layer during machining of the grooves permits the groove-forming tool to cut through the whole depth of the photoconductive layer without injuring the phosphor layer. Machining is rendered less critical since the cutting tool may enter the current diffusing layer a short distance without materially affecting its impedance in any direction.

The impedance of the current diffusing layer should be sufficiently high in directions parallel to its surface to prevent the voltage existing across an electroluminescent element excited by its associated photoconductive element from appearing across a neighboring unexcited electroluminescent element. The impedance of the current diffusing layer through its thickness should be low compared to a photoconductive element when illuminated and preferably lower than the electroluminescent layer. Under these conditions the flow of photocurrents through the electroluminescent layer will be relatively unimpeded. The current diffusing layer material may have a non-linear impedance characteristic. For example, the conductivity of the material may be proportional to the electric field raised to a power greater than unity. Such non-linear material tends to limit more sharply the spread of the photocurrents as they cross the current diffusing layer. In this way overlapping of photocurrents between adjacent electroluminescent elemental areas is reduced. The material previously mentioned, namely heat treated cadmium sulfide and cadmium chloride, has such a non-linear impedance characteristic.

A device such as indicated in Fig. 7 has been constructed with a photoconductive layer .014" thick, a current diffusing layer .010" thick and a .001" thick phosphor layer. The included angle between adjacent surfaces of the photoconductive layer was 60°, and the pitch distance measured between adjacent conductive lines was .025". The phosphor material was zinc sulfide and the photoconductive material was cadmium sulfide. With a daylight image incident on the photoconductor, an image was reproduced on the electroluminescent surface which was approximately 100 times brighter. With a projected image of light using a yellow electroluminescent light source, a light gain of approximately 20 times was obtained with the output electroluminescent light being of identical color and spectral distribution as the incident light.

Figure 8:
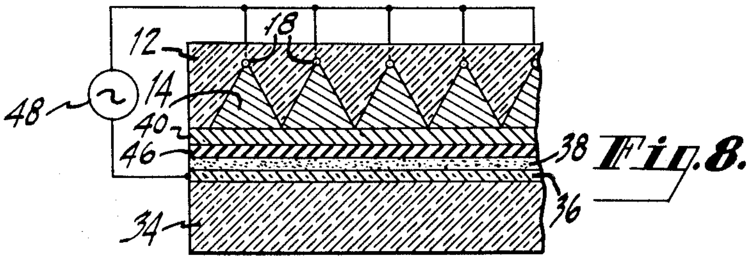
Fig. 8 is a section of a modification of Fig. 7.

In the modification shown in Fig. 8, the layer 42 of Fig. 7 is replaced by the transparent member 12 of Figs. 1 and 2 having grooves filled with photoconductive material to form a grooved photoconductive layer 14 adjacent to the electroluminescent phosphor layer 38, and conductive elements 12. The operation of this device is similar to that of Fig. 7. In the arrangement of Fig 8, the photoconductive layer and electroluminescent layer may be fabricated separately and then placed together with a layer of current-diffusing material sandwiched between.

The current-diffusing layer serves here to make electrical contact between corresponding points of the other two layers over their entire surface despite possible variation in spacing between them due to irregularities in the surfaces of either the photoconductive or electroluminescent layer.

Thus the invention makes possible the use of light cells and light amplifiers having thick photoconductor layers, and which devices are nevertheless rendered very sensitive to light.

What is claimed is:

1. A radiant energy sensitive member comprising a plurality of contiguous elongated photoconductive elements in an array of extended area, said elements having photoconductive surfaces which are inclined with respect to said array and which extend across the entire array, said inclined surfaces defining an effective projected area which is substantially equal to the entire area encompassed by said array.

2. A radiant energy sensitive device comprising a plurality of contiguous elongated photoconductive elements in an array of extended area, said elements having photoconductive surfaces which are inclined with respect to said array and which extend across the entire array, said inclined surfaces defining an effective projected area which is substantially equal to the entire area encompassed by said array, and a conductor extending along and in contact with each element on one side of said array.

3. A radiant energy sensitive device comprising a plurality of contiguous elongated photoconductive elements in an array of extended area, said elements having photoconductive surfaces which are inclined with respect to said array and which extend across the entire array, said inclined surfaces defining an effective projected area which is substantially equal to the entire area encompassed by said array, a layer of semi-conductive material in contact with said elements on one side of said array, and a conductor extending along and in contact with each element on the other side of said array.

4. A radiant energy sensitive device comprising a photoconductive layer and an electroluminescent layer arranged in a sandwich structure, said photoconductive layer including a plurality of contiguous elongated elements having photoconductive surfaces which are inclined with respect to said electroluminescent layer and which extend across the entire structure, said inclined surfaces being arranged to receive directly substantially all radiation which impinges said structure.

5. A radiant energy sensitive device comprising a sandwich structure including a photoconductive layer and an electroluminescent layer, said photoconductive layer having an overall thickness which is substantially greater than the thickness of said electroluminescent layer, said photoconductive layer being made up of a plurality of contiguous elongated elements of photoconductive material having V-shaped surfaces which extend across the entire structure.

6. A radiant energy sensitive device as in claim 5 wherein said photoconductive layer comprises a solid layer of powder particles and a plastic binder.

7. A radiant energy sensitive device comprising a thin layer of electroluminescent material and a relatively thick layer of photoconductive material, arranged in a sandwich structure, said photoconductive layer being provided with contiguous V-grooves extending across one entire side thereof and arranged to receive incident radiant energy, said V-grooves extending substantially the entire depth of said photoconductive layer, and a layer of semi-conductive material which has high conductivity through its thickness but relatively low conductivity parallel to its surface disposed between said photoconductive and electroluminescent layers.

8. A radiant energy sensitive device as in claim 7 wherein said last mentioned layer is made of a material having a non-linear impedance characteristic.

9. An electroluminescent device comprising a pair of spaced apart electrode means, one of said electrode means comprising a plurality of laterally spaced conductors, and contiguous layers of electroluminescent phosphor material and semi-conductive material sandwiched between and electrically connected in series with said electrodes.

10. An electroluminescent device as in claim 9, wherein said semi-conductive layer has a non-linear impedance characteristic.

11. An electroluminescent device as in claim 9, wherein the material of said semi-conductive layer has a conductivity that is proportional to a power of electric field greater than unity.

12. A radiant energy sensitive device comprising a sandwich structure including, in order, a photoconductive layer, a semi-conductive layer, and an electroluminescent layer, said semi-conductive layer having a non-linear impedance characteristic, and electrode means having said layers disposed in series therebetween, one of said electrode means being made up of laterally spaced conductors.

References Cited in the file of this patent

UNITED STATES PATENTS

| | | |
|---|---|---|
| 874,868 | Rothschild | Dec. 24, 1907 |
| 919,078 | Ribbe | Apr. 20, 1909 |
| 1,601,607 | Wein | Sept. 28, 1926 |
| 2,487,865 | Glassey | Nov. 15, 1949 |
| 2,650,310 | White | Aug. 25, 1953 |
| 2,732,469 | Palmer | Jan. 24, 1956 |
| 2,773,992 | Ullery | Dec. 11, 1956 |
| 2,789,193 | Anderson | Apr. 16, 1957 |
| 2,875,350 | Orthuber et al. | Feb. 24, 1959 |

FOREIGN PATENTS

| | | |
|---|---|---|
| 157,101 | Australia | June 16, 1954 |